US007761508B2

(12) United States Patent
Evans et al.

(10) Patent No.: US 7,761,508 B2
(45) Date of Patent: Jul. 20, 2010

(54) ACCESS DEVICE-BASED FRAGMENTATION AND INTERLEAVING SUPPORT FOR TUNNELED COMMUNICATION SESSIONS

(75) Inventors: John Evans, London (GB); William Mark Townsley, Pensacola, FL (US); Gary Lee Harris, Raleigh, NC (US); Jeffrey D. Haag, Raleigh, NC (US); John D. Bray, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 1330 days.

(21) Appl. No.: 11/238,527

(22) Filed: Sep. 28, 2005

(65) Prior Publication Data

US 2007/0071035 A1  Mar. 29, 2007

(51) Int. Cl.
G06F 15/16 (2006.01)
H04J 3/16 (2006.01)
H04J 3/24 (2006.01)
(52) U.S. Cl. .................. 709/204; 370/469; 370/474
(58) Field of Classification Search ............. 370/474, 370/310–430, 469, 473; 709/201–207, 227–237
See application file for complete search history.

(56) References Cited

U.S. PATENT DOCUMENTS 6,272,145 B1    8/2001  Malkin

| | | |
|---|---|---|
| 6,577,596 B1* | 6/2003 | Olsson et al. ............ 370/230 |
| 6,763,018 B1 | 7/2004 | Puthiyandyil et al. |
| 7,315,900 B1* | 1/2008 | Ofelt et al. ............... 709/238 |
| 2007/0195758 A1* | 8/2007 | Teraoka et al. ............. 370/389 |

OTHER PUBLICATIONS

Keagy, Scott ; Integrating Voice and Data Networks; Oct. 20, 2000; Cisco Press; Link Fragmentation/Interleaving Chapter.*
K. Sklower, B. Lloyd, G. McGregor, D. Carr, T. Coradetti, Request for Comments: 1990, The PPP Multilink Protocol (MP) (19 pages) www.apps.ietf.org/rfc/rfc1990.html.

* cited by examiner

*Primary Examiner*—Joseph E Avellino
*Assistant Examiner*—Afshawn Towfighi
(74) *Attorney, Agent, or Firm*—Marger Johnson & McCollom, P.C.

(57) ABSTRACT

Link fragmentation and interleaving at an access device located between a point to point link and a tunneled connection is provided. A method of access device-based link fragmentation and interleaving is also provided. The method includes receiving frames through a tunnel from a network server, fragmenting at least some of the frames from the network server, and sending fragmented and unfragmented frames over a data link to an endpoint device. The frames may be multilink point to point protocol (MLPPP) frames and the frames may be received through a layer two tunneling protocol (L2TP) tunnel. The method can include scanning a frame for PPP options and removing options related to MLPPP negotiation and then forwarding the frame to a network server.

12 Claims, 5 Drawing Sheets

ACCESS DEVICE-BASED FRAGMENTATION AND INTERLEAVING SUPPORT FOR TUNNELED COMMUNICATION SESSIONS

BACKGROUND OF THE INVENTION

Computers and computer networks have changed society and are as much a part of modern culture as television and telephones. People are becoming increasingly connected to share and access information. This interconnectivity promotes improvements in the computing and communication infrastructure.

Much of this infrastructure was designed for entertainment or communication, but is being adapted to also deliver general data. The addition of general information and data transmission over the legacy infrastructure is restrained by the need for the infrastructure to continue its initial functions. Most major entertainment and communication channels now include computer networking capabilities.

Similarly, many traditional networks transmit both raw data and real-time data such as voice over internet protocol (VoIP) as well as other streaming data with strict time constraints. Real-time data streams have strict time constraints but have lower reliability requirements, while other data does not have the time constraints of real-time data, therefore allowing robust and more reliable transmissions.

The Point-to-Point protocol (PPP), RFC 1661 dated July 1994, is a data link protocol and typically provides dial up access over analog or digital transmission lines. PPP provides features including, authentication, error detection, multiple protocol support, and negotiation of IP addresses at connection time.

PPP comprises three main features. It provides a framing method to delineate the end of one frame and the beginning of the next one, in order to handle error detection. It also provides a Link Control Protocol (LCP) for establishing and testing lines, negotiating options, and closing lines. And last, PPP provides a way to negotiate network layer options independent of the network layer protocol to be used.

PPP is commonly used as the data link protocol between a user and an Internet Service Provider (ISP) or access point. For example, a user may call an ISP through a modem with a personal computer. After the ISP's modem receives the call and establishes a physical connection, the personal computer may send LCP packets in the payload field of one or more PPP frames. In this regard a session may be negotiated, and the PPP parameters may be established for the session. After session negotiation and establishment of PPP parameters using LCP, an optional authentication phase may be entered.

Once the optional authentication phase is complete, a series of Network Control Protocol (NCP) packets may be sent to configure the network layer and assign an internet protocol (IP) address for the personal computer. At this point, the personal computer has become an Internet host and may send and receive IP packets. When the user has finished, different LCP control packets can be used to tear down the network layer connection and free the IP address, and also to shut down the data link layer connection. Finally, the personal computer hangs up the modem, releasing the physical layer connection.

PPP allows encapsulation of multi-protocol packets over layer two (L2) point-to-point links. For example, a PPP user may connect to a network access server (NAS) through dialup POTS, ISDN, ADSL, etc. and then run PPP over that connection. In the present example, the L2 and PPP both have an endpoint on the NAS.

PPP sessions may be tunneled through a packet network by Layer 2 Tunneling Protocol (L2TP) as described in RFC 2661. L2TP is loosely based on the Point-to-Point Tunneling Protocol (PPTP) and may be used by an Internet service provider (ISP) to enable the operation of a virtual private network (VPN) over a computer network such as the Internet.

The two main components that make up L2TP are an L2TP Access Concentrator (LAC), which is the device to physically terminate a call and the L2TP Network Server (LNS), which is the device that terminates the PPP session, and can even authenticate a PPP session. A PPP user may use an L2 connection to an access concentrator, and the concentrator can tunnel individual PPP frames to a LNS, allowing the packets to be processed in a different location than the circuit termination. This allows the circuit to terminate locally and reduce phone costs for the link.

Multiple PPP links may be coupled into a bundle using Multilink PPP (MLPPP) as described in RFC 1990 (PPP Multilink Protocol, August 1996). MLPPP provides a method to split, recombine and sequence datagrams across multiple logical data links.

According to RFC 1990, the goal of MLPPP is to coordinate multiple independent links between a fixed pair of systems, providing a virtual link with greater bandwidth than any of the constituent members. The aggregate link, or bundle, is named by the pair of identifiers for two systems connected by the multiple links. A system identifier may include information provided by PPP Authentication and information provided by LCP negotiation. The bundled links can be different physical links, as in multiple asynchronous lines, but may also be instances of multiplexed links, such as ISDN, X.25, or Frame Relay. The links may also be of different kinds, such as pairing dialup asynchronous links with leased synchronous links.

PPP sessions tunneled through L2TP traditionally forward all PPP frames, without knowledge of whether they are fragments in a multilink bundle or full PPP frames. Thus, for MLPPP sessions, the L2TP Access Concentrator (LAC) forwards all PPP packets from the links to the L2TP Network Server (LNS). It is then up to the LNS to fragment and reassemble fragments, and to forward the resultant layer three (L3) data.

Fundamental reasons for this form of operation in the past was (1) to offload the LAC, which may be a device packed with modems but with limited routing functionality, and (2) so that MLPPP sessions arriving from multiple LACs could be reassembled at a single location (e.g., the LNS).

A PPP link may fragment and interleave packets to manage traffic over the link. For example, PPP Link Fragmentation and Interleaving (LFI) utilizes the MLPPP protocol to fragment large frames into smaller frames on low-speed links in order to better the latency characteristics for delay-sensitive applications (such as voice) while using the same link for traffic which requires large data frames (such as browsing the web, uploading email, video transmission, etc.). LFI may utilize the MLPPP protocol even when not bundling multiple links.

U.S. Pat. No. 6,272,145, Malkin, describes a "Method and apparatus for communicating data across multiple communication links" In this, a L2TP is mentioned, together with a traditional method for forwarding link fragments from the LAC. Similarly, U.S. Pat. No. 6,763,018, Puthiyandyil, et. al., describes "PPP MultiLink in a Distributed Processing Environment" where the LNS is performing the fragmentation and reassembly of Multilink Frames.

Unfortunately, the traditional operation of performing fragmentation and reassembly for MLPPP at the LNS has negative consequences for the LFI application. For example, small packet fragments may be sent between the LAC and LNS, which statistically increases the probability of end to end packet loss as one lost or misordered fragment results in an entire lost frame. Also, small packets almost always have higher processing overhead for the amount of user-data transferred. Thus, the intervening network between an LAC and an LNS may be placed at a greater burden than if larger packets were sent.

Another negative consequence results since LFI MLPPP demands that Multilink fragments are delivered in order on a given link (RFC 1990, section 4.1). With fragmentation and reassembly at the LNS, there is a higher probability of misordering of MLPPP frames between the LAC and LNS, due to QoS (quality of service) or IP load balancing mechanisms (e.g., ECMP). L2TP provides its own, optional, packet sequencing method between the LAC and LNS to solve this problem, but this sequencing method does not come without overhead in terms of packet header size and processing for packets which are not sensitive to misordering.

U.S. Pat. No. 6,272,145 describes a "Method and apparatus for communicating data across multiple communication links" In this, a L2TP is mentioned, together with a traditional method for forwarding link fragments from the LAC. Similarly, U.S. Pat. No. 6,763,018 describes "PPP MultiLink in a Distributed Processing Environment" where the LNS is performing the fragmentation and reassembly of Multilink Frames.

Additionally, a drawback for conducting fragmentation at an LNS is that LFI relies on backpressure from physical interfaces to avoid queuing too many fragments to a link. Since the LNS is a physically separate device, it has no direct means of knowing when the physical link on the LAC is congested. As a result, when there is a large data packet to send, the LNS may immediately transmit all of the fragments of the packet even though those packets may be queuing on the LAC. Therefore, if a delay-sensitive packet arrives it may have to wait for all of the queued fragments to be sent. What is needed is an improved method and apparatus to provide link fragmentation and interleaving.

SUMMARY OF THE INVENTION

An embodiment may provide for link fragmentation and interleaving at an access device located between a point to point link and a tunneled connection. In an embodiment, a protocol or method to perform the link fragmentation and interleaving may be negotiated and may operate between an endpoint device and an access device while the access device can send or receive assembled frames to or from a network server through a tunneled connection.

An embodiment may provide for link fragmentation and interleaving at an access device located between a point to point link and a tunneled connection. An embodiment may include a method of receiving frames through a tunnel from a network server, fragmenting at least some of the frames from the network server, and sending fragmented and unfragmented frames over a data link to an endpoint device. In some embodiments the frames may be multilink point to point protocol (MLPPP) frames. In some embodiments, such as those used for LFI, the frames may include fragmented MLPPP frames and may also include PPP frames without MLPPP headers. In yet another embodiment, the frames may be received through a layer two tunneling protocol (L2TP) tunnel. An embodiment may include scanning a frame for PPP options and removing options related to MLPPP negotiation and then forwarding the frame to a network server.

An embodiment may comprise means capable of executing the embodiment method or may include instructions that when executed on a machine are capable of the embodiment method. An embodiment may include a device with a first port to send or receive fragmented frames to a data link, a second port to tunnel assembled frames to a network server through a packet network, and circuitry in communication with the first port and the second port, the circuitry to fragment link fragmentation frames to be sent through the first port, reassemble any fragmented frames received from the first port, and send or receive assembled frames through the second port.

BRIEF DESCRIPTION OF THE DRAWINGS

Embodiments of the invention may be best understood by reading the disclosure with reference to the drawings, wherein.

DETAILED DESCRIPTION

In the following description, numerous specific details are set forth. However, it is understood that embodiments of the inventions may be practiced without these specific details. In other instances, well-known circuits, structures, and techniques have not been shown in detail in order to not obscure the understanding of this description.

Reference in the specification to "one embodiment" or "an embodiment", etc., means that a particular feature, structure, or characteristic described in connection with the embodiment is included in at least one aspect of the invention. The appearances of the phrase "in one embodiment" in various places in the specification do not necessarily all refer to the same embodiment.

In an embodiment, an access device may communicate over a data-link with an endpoint device, for example customer premises equipment (CPE), and the access device may provide fragmentation and interleaving of data frames sent to the endpoint device. Additionally, the access device may fragment and interleave data over the data-link connection to the endpoint device while sending the data as assembled frames through a tunnel to the network server. In one embodiment, the access device may be a LAC, the network server an LNS, and the data-link may allow LFI between the LAC and the CPE while the LAC tunnels assembled frames to the LNS over a L2TP tunnel.

In this example an LNS may be linked to the LAC with a tunnel and be unaware that LFI (MLPPP) is taking place. LAC based LFI provides an efficient solution since the link between the LAC and the CPE is the only area where LFI may be necessary since the access link is slow, while the link between the LAC and LNS is fast and larger frames will have less impact on real-time data.

Figure 1:
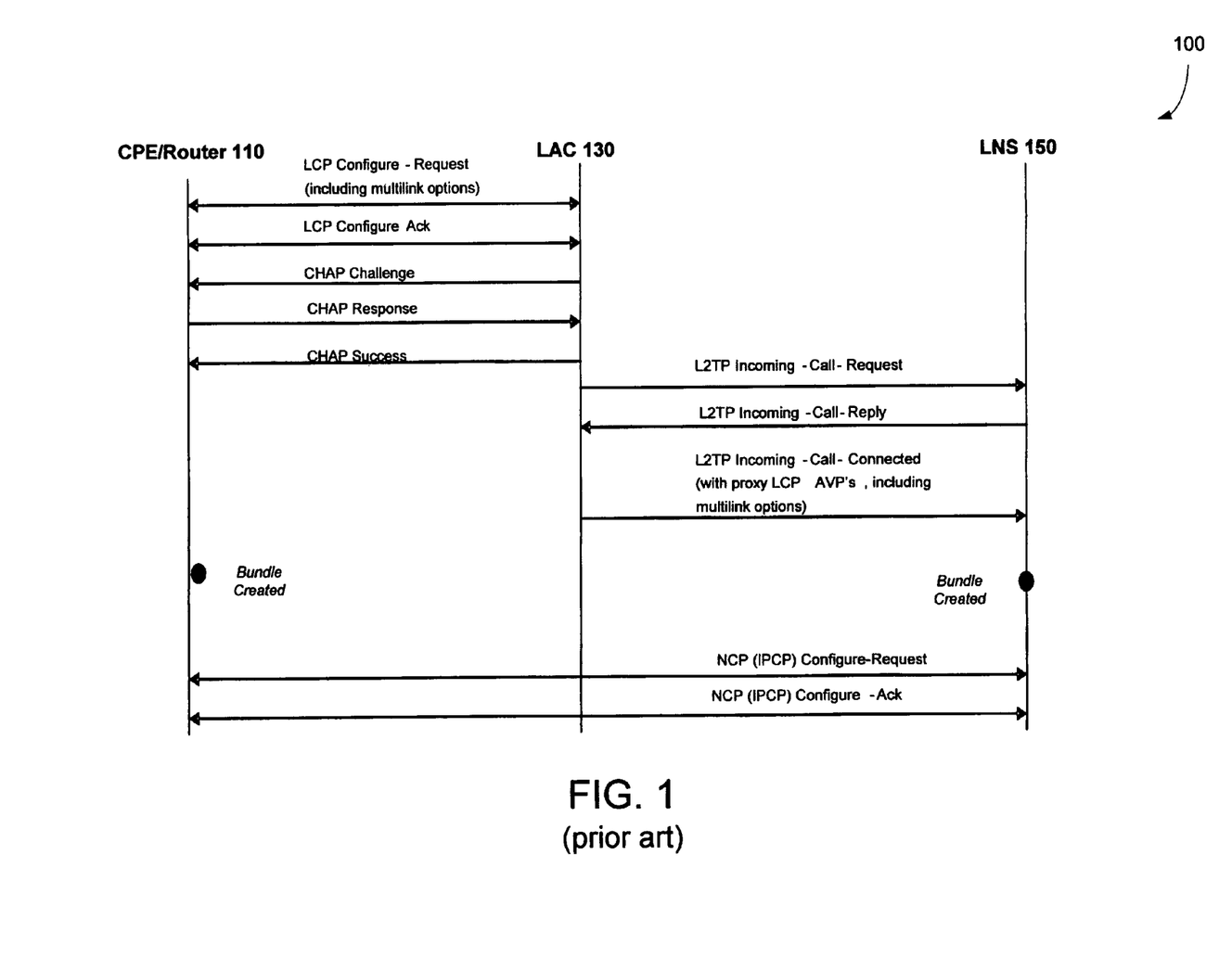
FIG. 1 illustrates a prior art method for link fragmentation and interleaving on a layer 2 tunneling protocol network server.

FIG. 1 illustrates a prior art method for link fragmentation and interleaving on an LNS. The left side of the flow diagram represents a CPE/Router 110, the middle of the diagram represents signaling to and from a LAC 130 and the right side of the diagram is an LNS 150. In this traditional method, the CPE/Router 110 establishes and operates a MLPPP session with the LNS 150 through LAC 130. In this regard, the LAC 130 forwards multilink fragments between the CPE/Router 110 and LNS 150. Furthermore, in this conventional method, a L2TP tunnel exists between LAC 130 and LNS 150 and a MLPPP session is sent through the L2TP tunnel while the LNS 150 does multilink bundling.

Referring to FIG. 1, the conventional approach is established by LCP Configure-Request frames, including multi-link options, between CPE/Router 110 and LAC 130. In response to the request, LCP Configure-Ack frames acknowledge the request and authentication takes place. In the present example, authentication happens through a Challenge Handshake Authentication Protocol (CHAP) through a challenge, a response, and if appropriate, a success communication from the LAC 130 authenticating the CPE/Router 110.

After authentication the LAC 130 transmits an L2TP Incoming-Call-Request to the LNS 150 and the LNS 150 responds with an L2TP Incoming-Call-Reply. After the L2TP Incoming-Call-Reply from the LNS 150, the LAC 130 responds with an L2TP Incoming-Call-Connection that may include LCP Attribute Value Pairs (AVPs), including multi-link options.

At this stage a bundle is created between CPE/Router 110 and LNS 150 and NCP IP Control Protocol (IPCP) frames can be sent to negotiate the IP address of the two end points, the TCP/IP header compression used on the link or naming resources such as Domain Name Server (DNS) and Windows Internet Naming Service (WINS).

Once the MLPPP session is established, the LAC 130 can forward multilink fragments between the CPE/Router 110 and LNS 150 and a L2TP tunnel exists between LAC 130 and LNS 150. As will be described in more detail below, embodiments may benefit if LFI can occur at an LAC 130, as opposed to the LNS 150.

Figure 2:
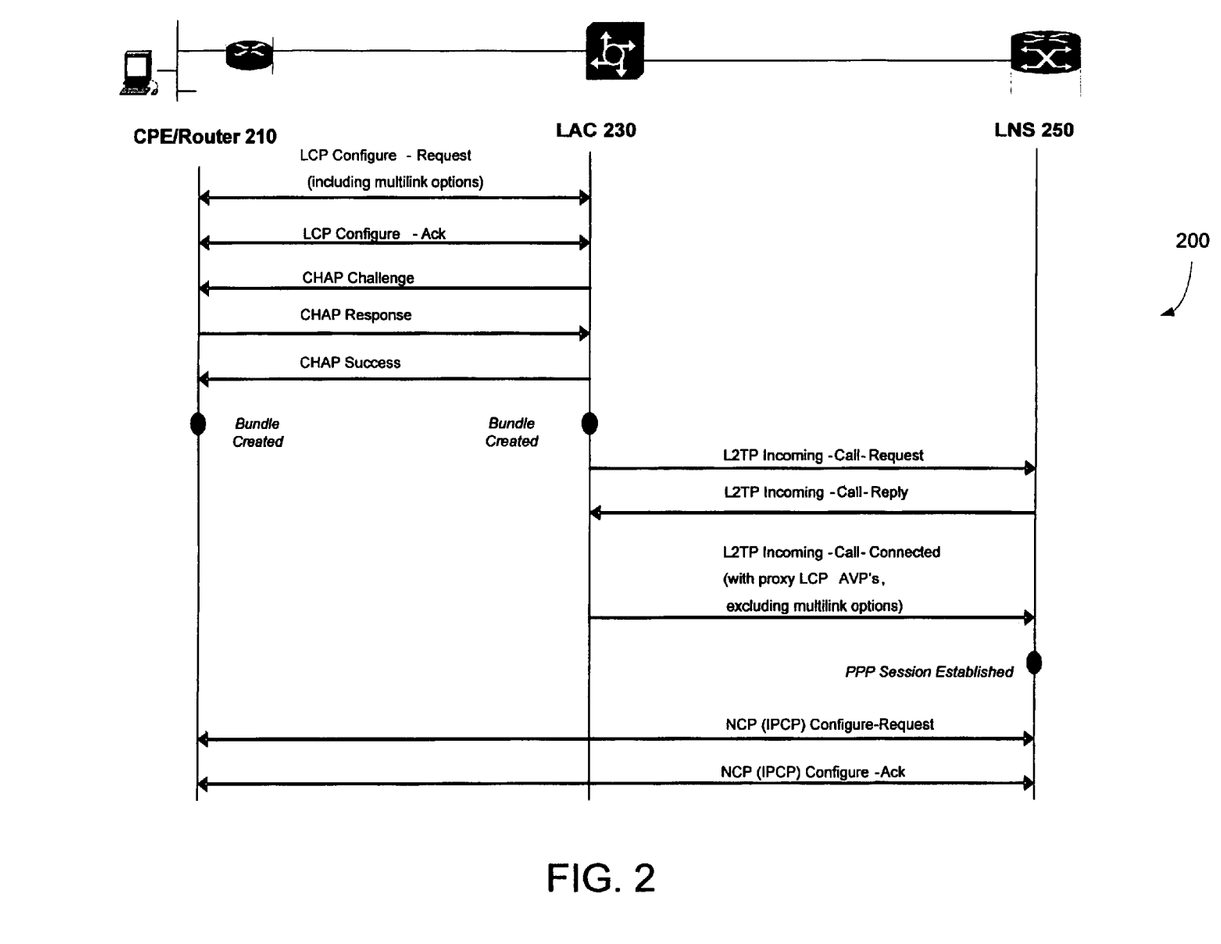
FIG. 2 illustrates an embodiment for fragmenting and interleaving data at a node between a data-link connection and a tunneled connection.

FIG. 2 illustrates an embodiment for fragmenting and interleaving data at a node between a data-link connection and a tunneled connection. In similar fashion to FIG. 1, the left side of the flow diagram represents a CPE/Router 210, the middle of the diagram represents signaling to and from a LAC 230 and the right side of the diagram is an LNS 250.

Referring to FIG. 2, an embodiment method may be established by LCP Configure-Request frames, including multi-link options, between CPE/Router 210 and LAC 230. In response to the request, LCP Configure-Ack frames acknowledge the request and authentication takes place. In the present example, authentication happens through a Challenge Handshake Authentication Protocol (CHAP) through a challenge, a response, and if appropriate, a success authenticating the CPE/Router 210.

At this point a MLPPP bundle may be created between LAC 230 and CPE/Router 210. Additionally, LAC 230 may send one or more L2TP sessions to the LNS 250 allowing the MLPPP to operate between the LAC 230 and CPE/Router 210 without LNS 250 doing MLPPP fragmentation. The embodiment in FIG. 2 may establish the L2TP Tunnel PPP session, without MLPPP, with the LNS 250 as follows.

After the bundle is created the LAC 230 transmits an L2TP Incoming-Call-Request to the LNS 250 and the LNS 250 responds with an L2TP Incoming-Call-Reply. After the L2TP Incoming-Call-Reply from the LNS 250, the LAC 230 responds with an L2TP Incoming-Call-Connection that may include LCP Attribute Value Pairs (AVPs), excluding multi-link options. Then, NCP IPCP frames can be sent to negotiate the IP address of the two end points, the TCP/IP header compression used on the link or naming resources such as Domain Name Server (DNS) and Windows Internet Naming Service (WINS).

An embodiment may allow fragmentation and reassembly of MLPPP frames at an L2TP LAC. In one embodiment, single-link LFI on a low-speed access link which has an L2TP-tunneled PPP session, may enable QoS for latency sensitive applications.

Referring to the embodiment in FIG. 2, a link on an LAC 230 may be provisioned for LFI. In this case, PPP must be negotiated at the LAC 230, and L2TP forwarded after negotiation is complete, utilizing the LCP Proxy feature of L2TP. This feature traditionally takes the last negotiated PPP LCP messages and encapsulates them in the L2TP Control Protocol so that the LNS 250 can continue PPP authorization and PPP NCP negotiation. Rather than pass these as received, the LAC 230 may remove the PPP options related to MLPPP negotiation before forwarding to the LNS 250. Example PPP options to be removed include the Maximum Receive Reconstructed Unit (MRRU) options. The LNS 250 may then receive the proxy LCP information and establish a PPP session as if MLPPP was not negotiated at all.

In the upstream direction from the LAC 230 to the LNS 250, it is now the LAC's responsibility to present non-MLPPP frames to the LNS 250. The LAC 230 may do this by reassembling any multilink frames received over the LFI-provisioned link with CPE/Router 210. The frame can then be encapsulated in a typical non-MLPPP frame before being tunneled to LNS 250. In the downstream direction (from the LAC 230 to the CPE/Router 210) the LAC 210 may fragment full non-MLPPP frames received from the LNS 250 to the CPE 210.

The present embodiment allows for per-packet QoS to be performed at the LAC 230 rather than the LNS 250. Specifically, any QoS which might cause packet reordering, should occur before fragmentation, as any potential reordering of fragments can break MLPPP operation. Of course, LCP Keepalives may require special processing at the LAC 230 as these exist for individual member links.

An embodiment may support the conventional mechanism of creating a bundle on the LNS 250 to handle a Multi-chassis Multi-link case, where we are tunneling multiple links from a CPE that have landed on different LACs. An embodiment may also provide for LAC-based LFI over multiple links, for example, when all of the links are terminated on a single LAC 230.

True multiple-member multilink bundles may require that an LNS 230 reassemble fragments as the links may arrive from multiple LACs 250. Multilink LFI enabled on a single link does not have this requirement. Embodiments may therefore benefit because packets are only fragmented where necessary, over the low-speed access link. Packet transmitted between a LAC 230 and LNS 250 should be on average larger, better utilizing the forwarding characteristics of the network and inducing less protocol overhead. An additional benefit is that tunneled packets between the LAC 230 and LNS 250 will be less susceptible to packet loss and reordering.

Referring to FIG. 2, an embodiment may also be a system comprising an endpoint device, such as CPE/Router 210, to forward frames over a data link, an access device, such as LAC 230, in communication with the endpoint device over the data link, the access device having circuitry to receive frames from the endpoint device over the data link, scan the frames and determine if the frames used link fragmentation, reassemble any fragmented frames, and forward any reassembled frame through a tunnel to a network server, for example LNS 250. In an embodiment the access device may further comprise circuitry to fragment frames to send to the endpoint device over the data link.

In an embodiment, the LAC 230 may be able to advertise to the LNS 250 that it has the capability to do LFI at the LAC 230. Furthermore, the LNS 250 may be able to detect that MLPPP is being negotiated for LFI and after checking with the policy for the current user, the LNS 250 may signal the LAC 230 to perform the LFI. For example, the present embodiment may cause an LCP renegotiation.

Figure 3:
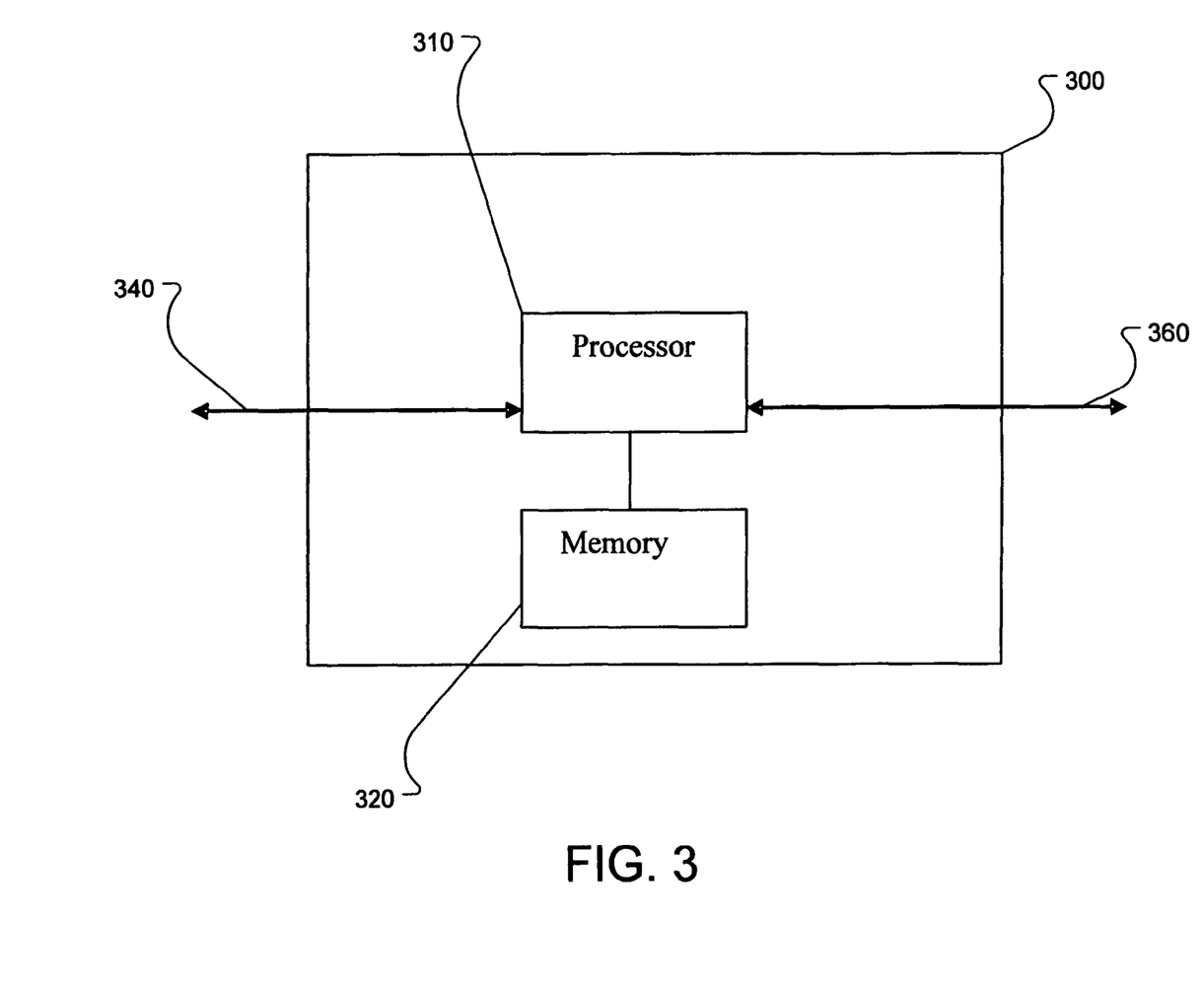
FIG. 3 illustrates an embodiment device for fragmenting and interleaving data at a node between a data-link connection and a tunneled connection.

FIG. 3 illustrates an embodiment device 300 for fragmenting and interleaving data at a node between a data-link connection and a tunneled connection. Referring to FIG. 3, an embodiment device 300 may include a processor 310 or any similar computing device, some memory 320 attached to the processor 310, a port 340 coupled with the processor 310, the port 340 to transmit or receive fragmented frames, and a port 360 coupled with processor 310 to transmit or receive data tunneled through a network. An example embodiment device 300 may be a router capable of functioning as an LAC, such as a Cisco 7200 Series Router.

An embodiment device 300 may include a first port 340 to send or receive fragmented frames to an endpoint device over a data link, a second port 360 to tunnel assembled frames through a tunnel to or from a network server; and circuitry 310 in communication with the first port 340 and the second port 360, the circuitry 310 to receive frames through a tunnel from a network server, fragment at least some of the frames from the network server, and send fragmented and unfragmented frames over a data link to an endpoint device. An embodiment may comprise circuitry to reassemble any fragmented frames received from the first port 340.

In another embodiment, the circuitry 310 may be able to determine if a frame is a fragmented frame, such as an LFI MLPPP frame. In yet another embodiment, wherein the second port 360 may connect to a network server 250 through a layer two tunneling protocol (L2TP) tunnel.

An embodiment may be an article of machine-readable medium containing instructions that, when executed, cause a machine such as device 310 to receive frames through a tunnel 360 from a network server 250, fragment at least some of the frames from the network server 250, and send fragmented and unfragmented frames over a data link to an endpoint device.

In the present embodiment, the data link frames may be multilink point to point protocol (MLPPP) frames and may be fragmented using LFI.

Yet another embodiment may contain instructions that, when executed, cause the machine to receive the frames through an L2TP tunnel from a network server, such as LNS 250.

Figure 4:
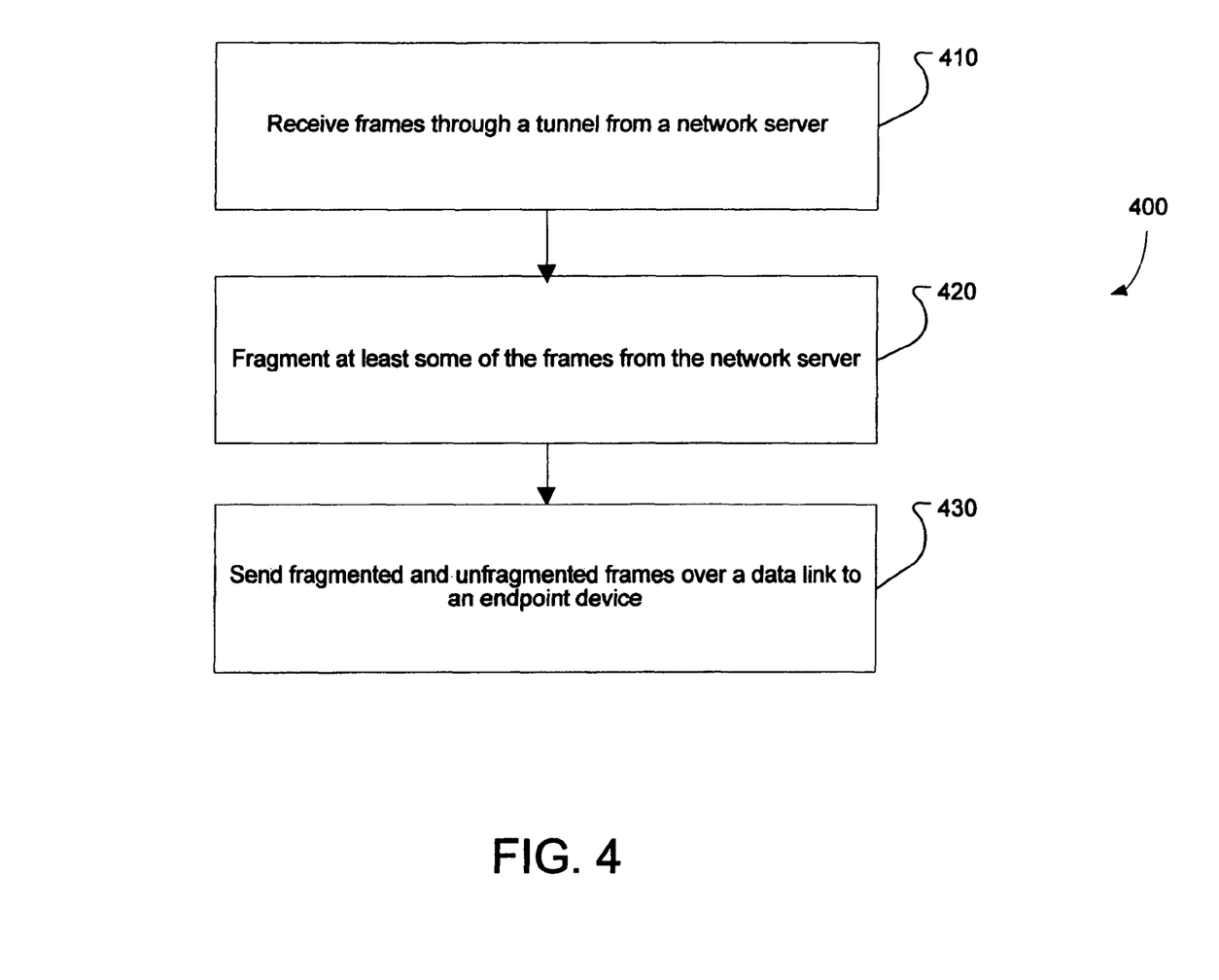
FIG. 4 illustrates an embodiment method for fragmenting and interleaving data at a node between a data-link connection and a tunneled connection.

FIG. 4 illustrates an embodiment method 400 for fragmenting and interleaving data at a node between a data-link connection and a tunneled connection. Referring to FIG. 4, an embodiment method may include receiving frames through a tunnel from a network server as shown in block 410, in block 420 the method may include fragmenting at least some of the frames from the network server, and in block 430 the method may include sending fragmented and unfragmented frames over a data link to an endpoint device.

Figure 5:
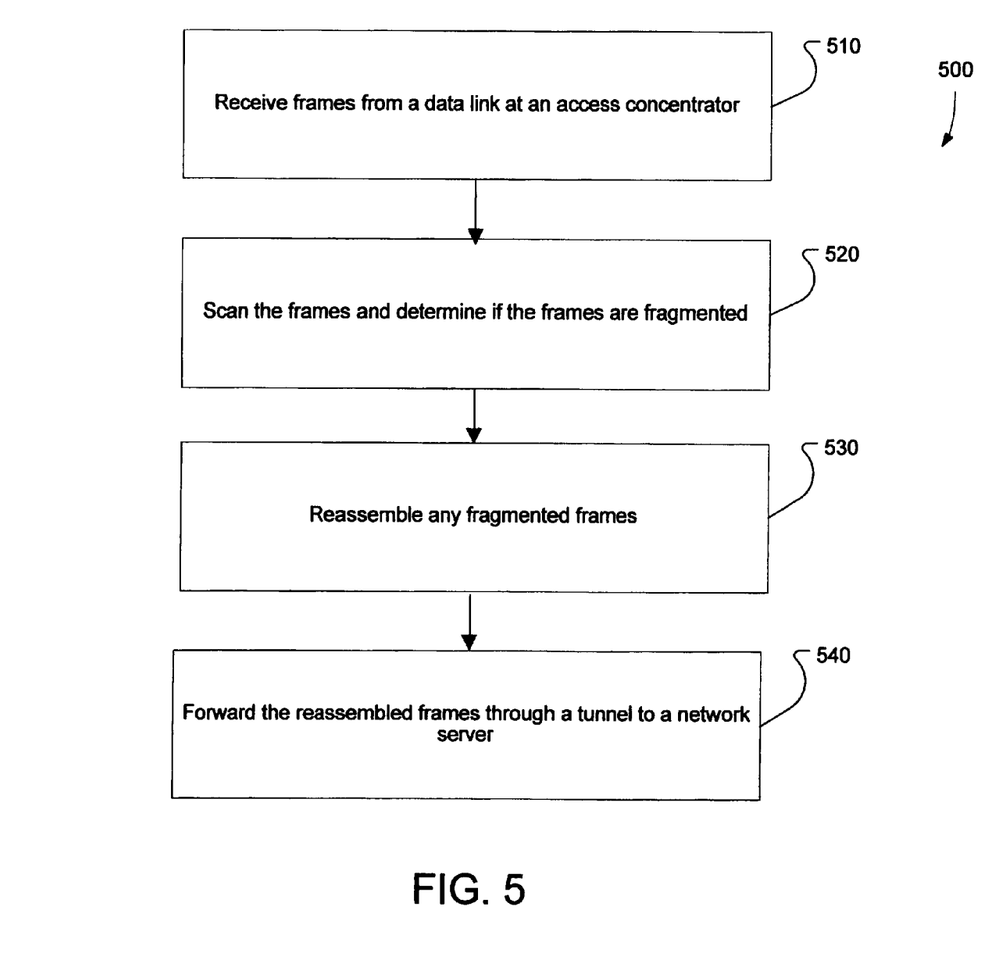
FIG. 5 illustrates an embodiment method 500 for reassembling fragmented data at a node between a data-link and a tunneled connection.

FIG. 5 illustrates an embodiment method 500 for reassembling fragmented data at a node between a data-link and a tunneled connection. Referring to FIG. 5, an embodiment method may include receiving frames from a data link at an access concentrator in block 510, in block 520 the method may include scanning the frames and determining if the frames are fragmented, in block 530 the method may include reassembling any fragmented frames, and in block 540 the method may include forwarding the reassembled frames through a tunnel to a network server.

In an embodiment the frames may be MLPPP frames. In some embodiments, such as those used for LFI, the frames may include fragmented MLPPP frames and may also include PPP frames without MLPPP headers. Yet another embodiment may include receiving the frames through an L2TP tunnel from a network server, such as LNS 250. An embodiment may include scanning a frame for PPP options and removing options related to MLPPP negotiation and then forwarding the frame to a network server.

Embodiment methods may involve frames being fragmented or assembled at an access device, such as LAC 230, or likewise may include frames being fragmented or assembled at an endpoint device such as CPE/Router 210, that is, the ability to fragment or assemble at the access device is contemplated and embodiment devices and methods may practice either or both fragmentation or assembly.

The present invention may be embodied in other specific forms without departing from its spirit or essential characteristics. The described embodiments are to be considered in all respects only as illustrative instead of restrictive or limiting. Therefore, the scope of the invention is indicated by the appended claims rather than by the foregoing description. All changes, modifications, and alterations that come within the meaning, spirit, and range of equivalency of the claims are to be embraced as being within the scope of the appended claims.

The invention claimed is:

1. A method comprising:
   creating a bundle on a first network between an access concentrator and an endpoint device before creating a tunnel on a second network between the access concentrator and a network server, wherein the access concentrator is configured to physically terminate a call from the endpoint device and the network server is configured to terminate a PPP session from the endpoint device;
   receiving non-multilink frames at the access concentrator through the tunnel from the network server, where the endpoint device is a destination for the non-multilink frames;
   fragmenting at least some of the non-multilink frames from the network server at the access concentrator; and
   sending fragmented and unfragmented frames over a data link from the access concentrator to the endpoint device, the data link comprising at least a portion of the bundle, such that only non-multilink frames are transferred between the access concentrator and the network server; wherein sending frames over the data link includes sending multilink point to point protocol (MLPPP) frames; and
   Interleaving PPP frames without multilink headers between multilink fragments and sending the frames over the data link
   receiving a frame at the access concentrator from the endpoint device; scanning the frame for PPP options at the access concentrator;
   removing options related to MLPPP negotiation, the removed options including Maximum Receive Reconstructed Unit (MRRU) options; and
   then forwarding the frame to the network server.

2. The method of claim 1 wherein receiving frames through a tunnel from a network server includes receiving the frames through a layer two tunneling protocol (L2TP)tunnel.

3. A device comprising:
a first port to receive fragmented frames from an endpoint device over a data link;
a second port to tunnel assembled frames through a tunnel to a network server, wherein only non-multilink frames are tunneled to the network server; and
circuitry in communication with the first port and the second port, the circuitry to: receive non-multilink frames through the tunnel from the network server; fragment at least some of the frames from the network server; and send fragmented and unfragmented frames over the data link to the endpoint device, wherein the fragmented frames are multilink point to point protocol (MLPPP) frames, and wherein the fragmented frames are fragmented with link fragmentation and interleaving (LFI) without multilink headers between multilink fragments and sending the frames over the data link circuitry to receiving a frame from the endpoint device; scanning the frame for PPP options;
removing options related to MLPPP negotiation, the removed options including Maximum Receive Reconstructed Unit (MRRU) options; and
then forwarding the frame to the network server.

4. The device of claim 3 further comprising circuitry to determine if an incoming frame is fragmented.

5. The device of claim 3 wherein the circuitry is further to reassemble incoming frames from the endpoint device and to send the reassembled incoming frames through the second port to the network server through a layer two tunneling protocol (L2TP)tunnel.

6. The device of claim 3 further comprising circuitry to reassemble any fragmented frames received from the first port.

7. A device comprising: means for creating a bundle on a first network between an access concentrator and an endpoint device before creating a tunnel on a second network between the access concentrator and a network server, wherein the access concentrator is configured to physically terminate a call from the endpoint device and the network server is configured to terminate a PPP session from the endpoint device;
means for receiving non-multilink frames at the access concentrator destined for the endpoint device through a tunnel from a network server;
means for fragmenting at least some of the non-multilink frames from the network server at the access concentrator; and
means for sending fragmented and unfragmented frames over a data link from the access concentrator to the endpoint device, the data link comprising at least a portion of the bundle, such that only non-multilink frames are transferred between the access concentrator and the network server; wherein means for sending frames over a data link includes means for sending multilink point to point protocol (MLPPP) frames;
means for interleaving PPP frames without multilink headers between multilink fragments and sending the frames over the data link;
means for scanning a frame for PPP options and removing options related to MLPPP negotiation and means for forwarding the frame to a network server.

8. The device of claim 7 wherein means for receiving frames through a tunnel from a network server includes means for receiving the frames through a layer two tunneling protocol (L2TP)tunnel.

9. A non-transitory computer readable medium containing instructions that, when executed, cause a machine to:
create a bundle on a first network between an access concentrator and an endpoint device before creating a tunnel on a second network between the access concentrator and a network server, wherein the access concentrator is configured to physically terminate a call from the endpoint device and the network server is configured to terminate a PPP session from the endpoint device;
receive non-multilink frames at the access concentrator destined for the endpoint device through a tunnel from a network server;
fragment at least some of the non-multilink frames from the network server at the access concentrator; and
send fragmented and unfragmented frames over a data link from the access concentrator to the endpoint device, the data link comprising at least a portion of the bundle, such that only non-multilink frames are transferred between the access concentrator and the network server, wherein at least some of the frames sent over the data link are multilink point to point protocol (MLPPP) frames;
interleave PPP frames without multilink headers between multilink fragments and send the frames over the data link;
scan a frame for PPP options and remove options related to MLPPP negotiation and to forward the frame to a network server.

10. The non-transitory computer readable medium of claim 9 further causing the machine to receive the frames through a layer two tunneling protocol (L2TP) tunnel.

11. A system comprising: an endpoint device to forward multilink frames over a data link;
an access device in communication with the endpoint device over the data link, the access device having circuitry to:
create a bundle between the endpoint device and the access device, the bundle including the data link;
receive the multilink frames from the endpoint device over the data link; scan the multilink frames from the endpoint device for multilink options; remove the multilink options; reassemble the multilink frames; forward reassembled frames to a network server through a tunnel; receive non-multilink frames through the tunnel from the network server; fragment at least some of the frames from the network server;
interleave fragmented and unfragmented frames, wherein the access device is to interleave PPP frames without multilink headers between multilink fragments and send the frames over the data link; and
send the fragmented and unfragmented frames over the data link to the endpoint device, wherein the access device is to send multilink point to point protocol (MLPPP) frames over the data link to the endpoint device; and
scan an incoming frame from the endpoint device for PPP options and remove options related to MLPPP negotiation and to forward the incoming frame to a network server.

12. The system of claim 11 wherein the access device is to receive the frames through a layer two tunneling protocol (L2TP)tunnel.

* * * * *